US008583795B2

(12) United States Patent
Chor

(10) Patent No.: US 8,583,795 B2
(45) Date of Patent: Nov. 12, 2013

(54) URI SERVICE SYSTEM AND METHOD

(75) Inventor: Jesse Chor, Bellevue, WA (US)

(73) Assignee: MSKYNET Inc., Seattle, WA (US)

( * ) Notice: Subject to any disclaimer, the term of this patent is extended or adjusted under 35 U.S.C. 154(b) by 513 days.

(21) Appl. No.: 12/908,547

(22) Filed: Oct. 20, 2010

(65) Prior Publication Data

US 2012/0036226 A1   Feb. 9, 2012

Related U.S. Application Data

(63) Continuation-in-part of application No. 12/852,730, filed on Aug. 9, 2010, now Pat. No. 8,438,245.

(51) Int. Cl.
*G06F 15/173* (2006.01)
*G06F 15/16* (2006.01)

(52) U.S. Cl.
USPC ........... 709/225; 709/238; 709/239; 709/240; 709/245

(58) Field of Classification Search
USPC ................... 709/225, 238–240, 245
See application file for complete search history.

(56) References Cited

U.S. PATENT DOCUMENTS

| | | | | |
|---|---|---|---|---|
| 7,490,134 B2* | 2/2009 | Ono et al. | | 709/217 |
| 2006/0243807 A1* | 11/2006 | Tien | | 235/462.15 |
| 2009/0108057 A1* | 4/2009 | Mu et al. | | 235/375 |
| 2011/0035262 A1* | 2/2011 | Meriaz et al. | | 705/14.1 |
| 2011/0279851 A1* | 11/2011 | Berger et al. | | 358/1.15 |
| 2011/0283196 A1* | 11/2011 | Berger et al. | | 715/738 |
| 2011/0289434 A1* | 11/2011 | Kieft | | 715/760 |
| 2012/0055984 A1* | 3/2012 | Van Megchelen | | 235/375 |

* cited by examiner

*Primary Examiner* — Hieu Hoang
(74) *Attorney, Agent, or Firm* — Æ ON Law; Adam L. K. Philipp

(57) ABSTRACT

A URI-redirection via machine-scannable-code system and method are provided herein.

11 Claims, 15 Drawing Sheets

URI SERVICE SYSTEM AND METHOD

CROSS REFERENCE TO RELATED APPLICATIONS

This application is a continuation in part of U.S. application Ser. No. 12/852,730, filed on Aug. 9, 2010 (pending), titled "REMOTE APPLICATION INVOCATION SYSTEM AND METHOD," naming inventor Jesse Chor. The above-cited application is incorporated herein by reference in its entirety, for all purposes.

FIELD

The present disclosure relates to networked computing services, and more particularly to handling URIs via machine-scannable codes.

BACKGROUND

The term "mobile tagging" refers to the process of providing data to mobile devices, commonly through the use of data (e.g., a Uniform Resource Locator or "URL") encoded in a two-dimensional barcode. For example, addresses and/or URLs are commonly encoded in two-dimensional barcodes (e.g., QR Codes, Data Matrix codes, High Capacity Color Barcodes or "HCCBs," and the like) that are printed in magazines, on signs, buses, business cards, or other object. Users with a camera phone equipped with an appropriate reader application can scan the image of the two-dimensional barcode to display text, contact information, connect to a wireless network, open a webpage in the phone's browser, and/or perform other operations. For example, the Android operating system for mobile devices (provided by Google Inc. of Menlo Park, Calif.) supports the use of QR codes by natively including a barcode scanner application on some device models and by including a browser that supports Uniform Resource Identifier ("URI") redirection, which allows QR Codes to send metadata to existing applications on the device. The Symbian OS (provided by Nokia Corporation of Tempere, Finland) also includes a barcode scanner that is able to read QR Codes.

Generally speaking two-dimensional barcodes encode some sort of actionable text (or other data). For example, text representing contact information, when recognized by a barcode scanner application, could add the contact information to an address book on the device. Similarly, text representing an event or appointment, when recognized, could add the event or appointment to a calendar on the device; text representing geo-location information, when recognized, could open a map application on the device; and so on.

However, actionable text, such as the examples mentioned above, can only be acted on when the barcode scanner application understands the format of the actionable text encoded in the two-dimensional barcode. Some format standards exist and are commonly used for encoding actionable text in a two-dimensional barcode. For example, perhaps the most common actionable text encoded in two-dimensional barcodes is text that represents a URL, e.g. "http://google.com/m". This string of text would be generally recognized as a URL by virtually all barcode scanner applications, and the resulting action would typically be to open the URL in a browser application on the device.

However, not all actionable text formats are so universally recognizable, and many different mobile device manufacturers and/or mobile device operating system providers may implement proprietary standards for formatting actionable text in two-dimensional barcodes. For example, mobile devices provided by NTT DoCoMo, Inc. of Tokyo, Japan may recognize URLs encoded using an alternate format, e.g. "MEBKM:TITLE:NTT DOCOMO;URL:http¥://i.nttdocomo.co.jp/f/;". While mobile devices provided by NTT DoCoMo may recognize such a URI, other types of mobile device may not recognize such a URI.

Similarly, differing formal and/or de-facto standards may be used by different types of mobile devices for interpreting encoded contact information, event/appointment information, and other types of information. Consequently, it may be difficult or even impossible in some cases to provide a single two-dimensional barcode that will cause a variety of different types of mobile devices to perform a desired action.

In addition, different types of mobile devices may implement cameras or other scanning components that have differing capture capabilities. While various types of two-dimensional barcode may be able to encode several kilobytes (or more) of information, not all mobile devices may be able to properly recognize many densely-packed two-dimensional barcodes. For example, a first mobile device with an auto-focus macro lens may be able to capture and resolve a two-dimensional barcode encoded with several kilobytes of data, while a second mobile device, with a fixed-focus lens, may only be able to resolve as little as 200 bytes of data. Consequently, even if the first and second devices both supported the same actionable text format, the second device may still be incapable of acting on an information-dense two-dimensional barcode due to hardware limitations of the second device's capture components.

DESCRIPTION

Figure 1:
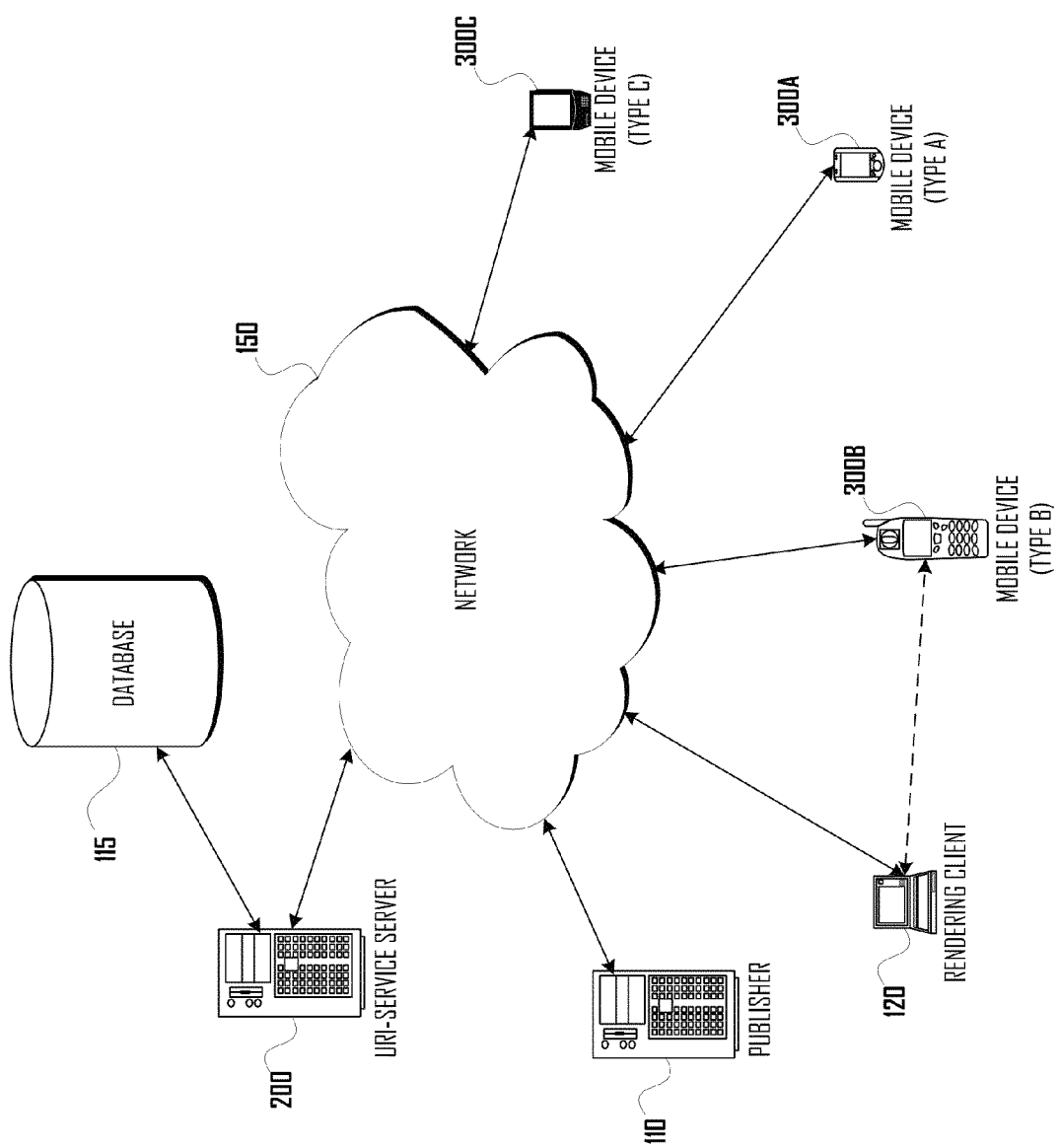
FIG. 1 illustrates an exemplary remote application invocation system according to one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary remote application invocation system 100 according to one embodiment in which mobile devices 300A-C (see FIG. 3, discussed below), rendering client 120, and URI-service server 200 (see FIG. 2, discussed below) are connected to a network 150. In some embodiments, rendering client 120 may be associated with and/or visible to one or more of mobile devices 300A-C. In some embodiments, a publisher device 110 is also connected to network 150, and URI-service server 200 is in communication with database 115 (which may also be connected to network 150 in some embodiments). In some embodiments, publisher device 110 may also be in direct communication with URI-service server 200. In other embodiments, URI-service server 200 and publisher device 110 may comprise a single device.

In some embodiments, other servers and/or devices (not shown) may also be present. For example, in some embodiments, one or more proxy devices, firewalls, and/or other intermediaries (not shown) may exist between URI-service server 200, some or all of clients 300A-C, and/or rendering client 120.

In some embodiments, URI-service server 200 may communicate with database 115 via network 150, a storage area network ("SAN"), a high speed serial bus, and/or via other suitable communication technology. In some embodiments, URI-service server 200, publisher device 110, and/or database 115 may comprise one or more replicated and/or distributed physical or logical devices.

In various embodiments, network 150 may include the Internet, a local area network ("LAN"), a wide area network ("WAN"), a cellular data network, and/or other data network. In many embodiments, there may be more mobile devices 300 than are illustrated.

Figure 2:
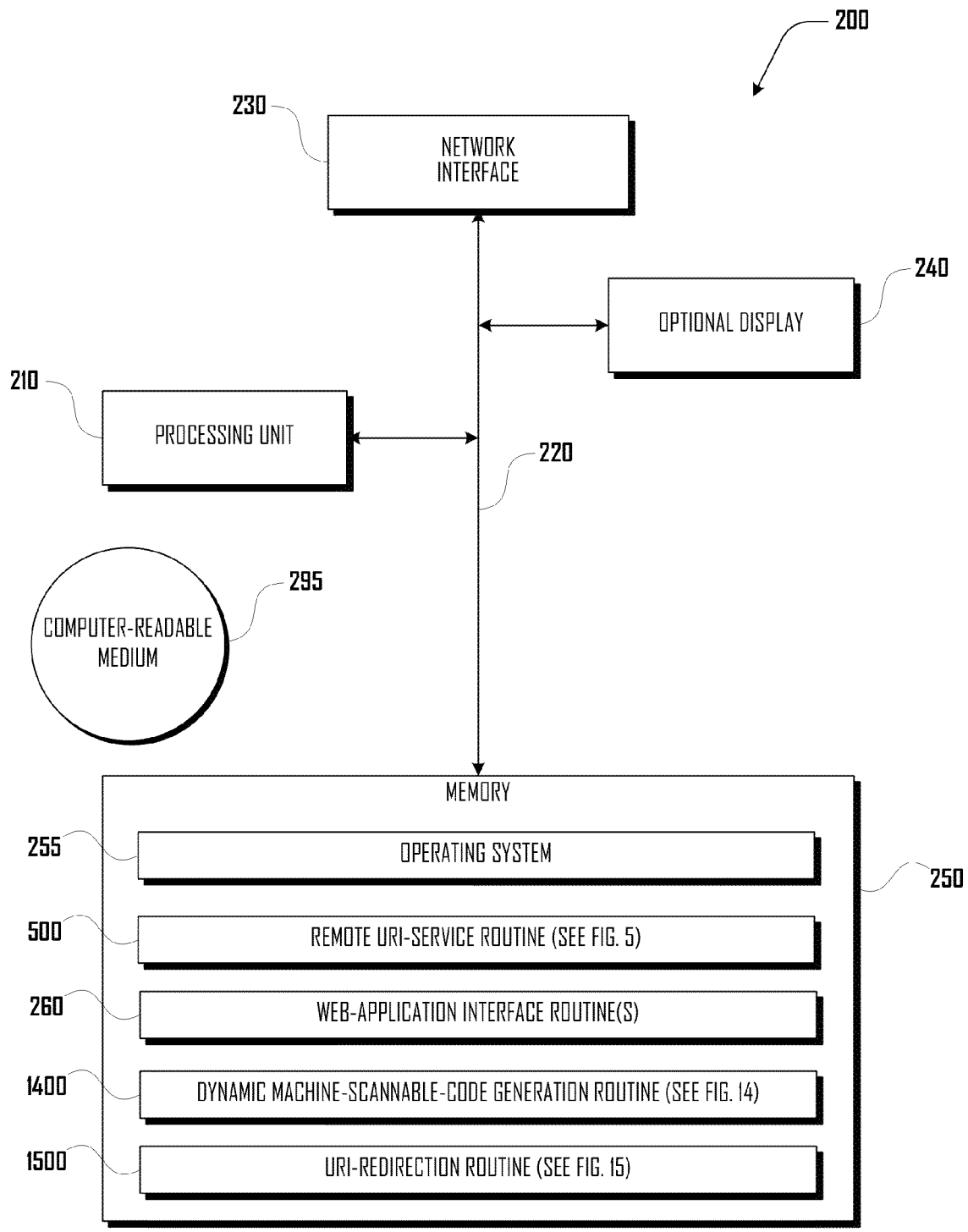
FIG. 2 illustrates several components of an exemplary URI-service server.

FIG. 2 illustrates several components of an exemplary URI-service server 200. In some embodiments, URI-service server 200 may include many more components than those shown in FIG. 2. However, it is not necessary that all of these generally conventional components be shown in order to disclose an illustrative embodiment. As shown in FIG. 2, URI-service server 200 includes a network interface 230 for connecting to the network 150.

The URI-service server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for a remote-application invocation routine 500 (see FIG. 5, discussed below), one or more web-application interface routines 260, a dynamic machine-scannable-code generation routine 1400 (see FIG. 14, discussed below), and a URI-redirection routine 1500 (see FIG. 15, discussed below). In addition, the memory 250 also stores an operating system 255. These software components may be loaded from a computer readable storage medium 295 into memory 250 of the URI-service server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a computer readable storage medium 295.

In some embodiments, URI-service server 200 may further comprise a specialized interface (not shown) for communicating with database 115, such as a high speed serial bus, or the like. In some embodiments, URI-service server 200 may communicate with database 115 via network interface 230. In other embodiments, database 115 may reside in memory 250.

Although an exemplary URI-service server 200 has been described that generally conforms to conventional general purpose computing devices, an URI-service server 200 may be any of a great number of devices capable of communicating with the network 150, database 115, and/or clients 300A-C, for example, a personal computer, a game console, a set-top box, a handheld computer, a cell phone, or any other suitable device.

Figure 3:
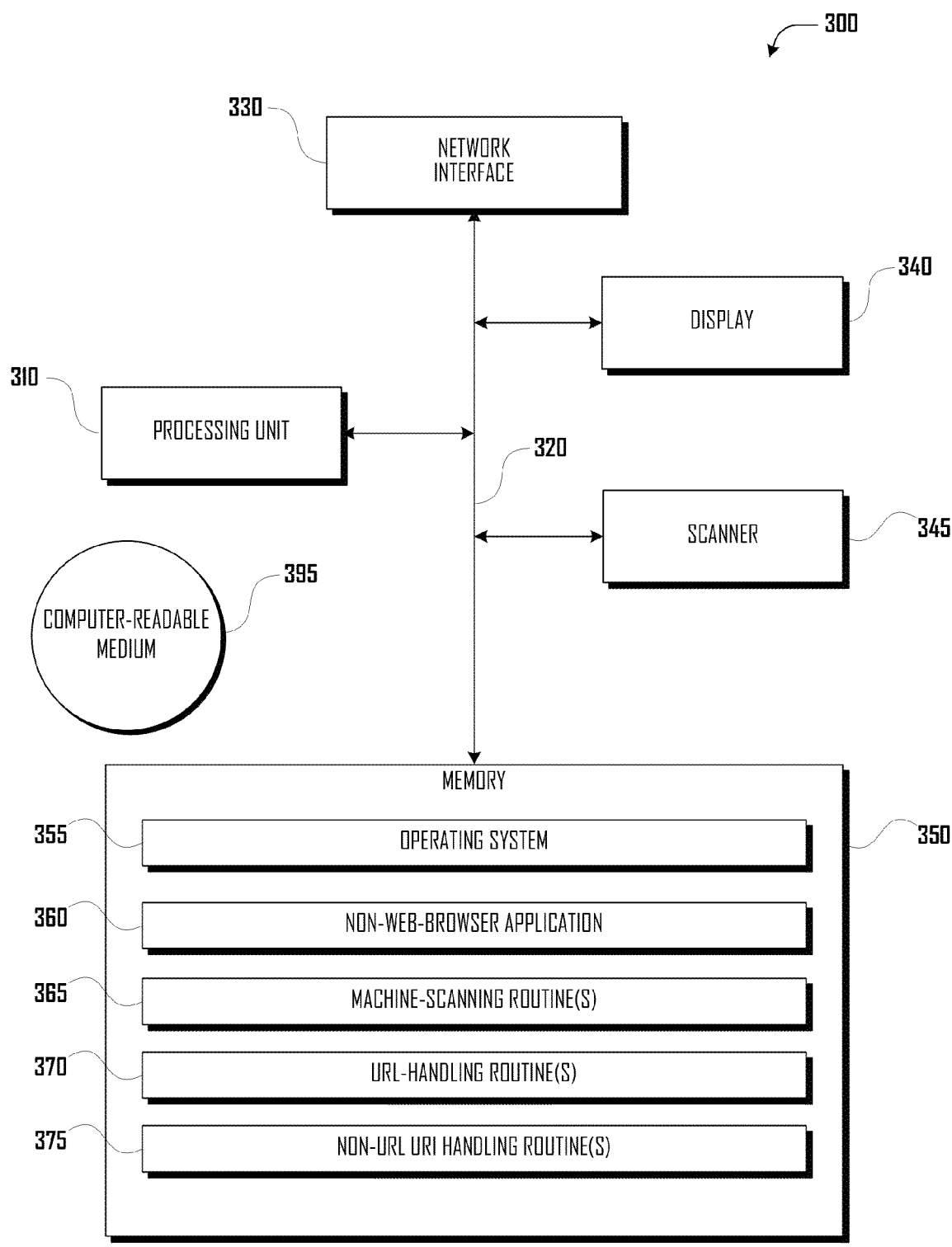
FIG. 3 illustrates several components of an exemplary mobile device.

FIG. 3 illustrates several components of an exemplary mobile device 300. In some embodiments, mobile device 300 may include many more components than those shown in FIG. 3. However, it is not necessary that all of these generally conventional components be shown in order to disclose an illustrative embodiment. As shown in FIG. 3, mobile device 300 includes a network interface 330 for connecting to the network 150.

The mobile device 300 also includes a processing unit 310, a memory 350, and a display 340, all interconnected along with the network interface 330 via a bus 320. The memory 350 generally comprises a random access memory ("RAM"), a read only memory ("ROM"), and a permanent mass storage device, such as a disk drive, flash memory, or other persistent storage technology. The memory 350 stores program code for a non-web-browser application 360, as well as one or more routines 365, 370, 375 for respectively handling machine scanning operations (including scanning, decoding, and interpreting machine-scannable codes), URL handling operations (e.g., a web browser and routines for invoking the web browser), and non-web-browser URI handling operations (e.g., one or more non-web-browser applications and routines for invoking the non-web-browser applications). In addition, the memory 350 also stores an operating system 355. These software components may be loaded from a computer readable storage medium 395 into memory 350 of the mobile device 300 using a drive mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

The mobile device 300 also includes a scanner 345 capable of capturing information encoded in machine-scannable codes. For example, in some embodiments, scanner 345 may comprise a camera or other optical scanner for capturing optically-encoded machine-scannable codes, such as bar-codes, two-dimensional barcodes, and the like. In other embodiments, scanner 345 may comprise a radio transmitter and/or receiver for capturing radio-frequency identification ("RFID") tags and the like. In still other embodiments, scanner 345 may comprise suitable components for scanning or reading codes encoded in other machine-scannable media Although an exemplary mobile device 300 has been described that generally conforms to conventional general purpose computing devices, an mobile device 300 may be any of a great number of devices capable of communicating with the network 150 and/or URI-service server 200, for example, a personal computer, a game console, a set-top box, a handheld computer, a cell phone, or any other suitable device.

Figure 4:
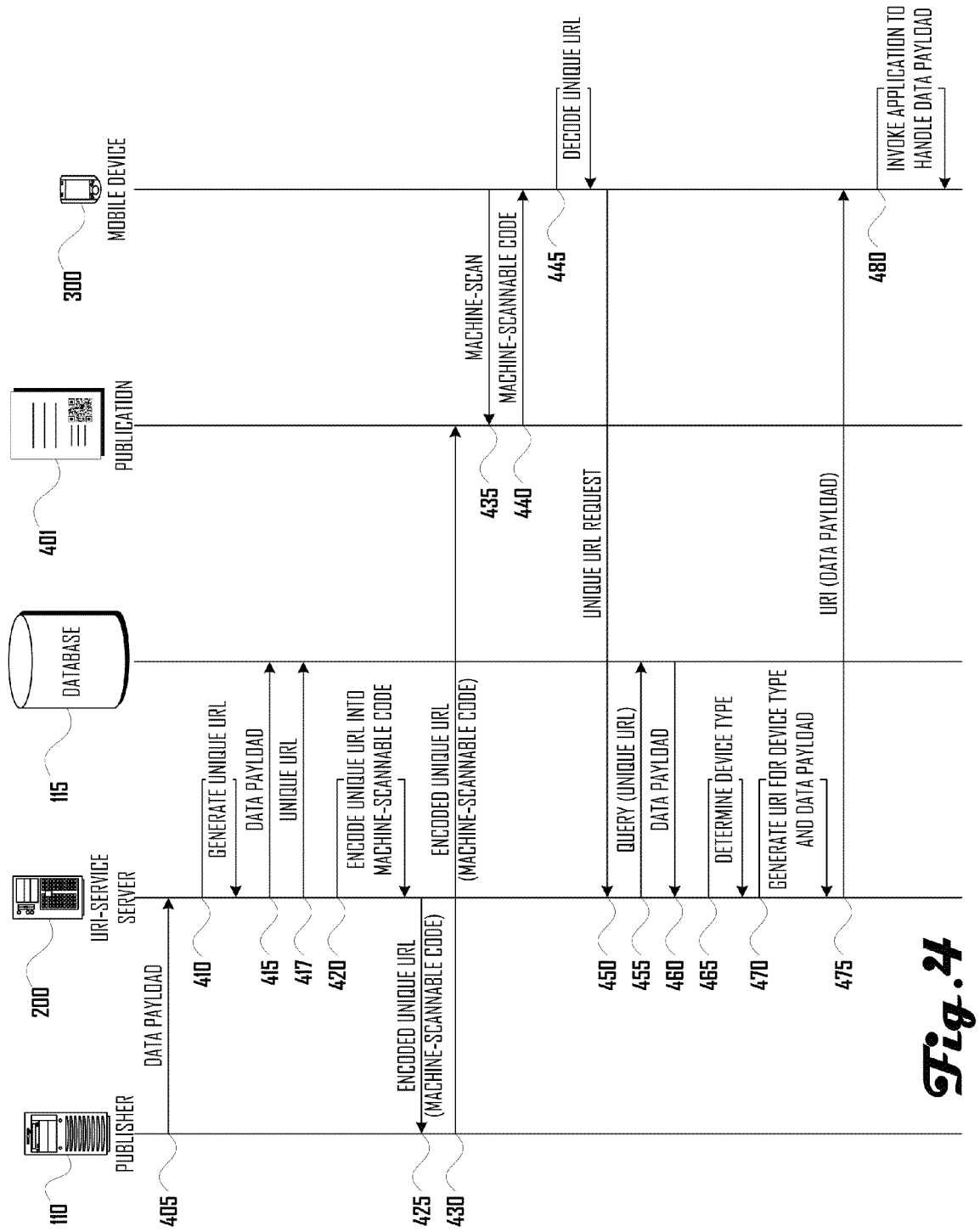
FIG. 4 illustrates an sequence of data communications for an exemplary remote-application invocation scenario, in accordance with one embodiment.

FIG. 4 illustrates an sequence of data communications for an exemplary remote-application invocation scenario, in accordance with one embodiment. Publisher 110 has an actionable data payload for exposure, via a machine-scannable code, to at least one mobile device 300 from among a number of mobile devices (not shown) of differing mobile device types. The actionable payload should invoke a non-web-browser application on the differing mobile device types, and the differing mobile device types require differing URI formats to invoke the intended non-web-browser application.

For example, in various embodiments, the actionable data payload may include information such as contact information (for invoking address book or contact manager applications on the differing mobile device types), geo-location information (for invoking geo-mapping applications on the differing mobile device types), event information (for invoking calendar or appointment applications on the differing mobile device types), downloadable content information (for invoking store or e-commerce applications on the differing mobile device types), and the like. In some embodiments, the actionable data payload may include one kilobyte or more of data, but mobile device 300's scanner may not be capable of resolving more than about 200 bytes of data.

Publisher 110 sends actionable data payload 405 to URI-service server 200, which generates 410 a unique URL associated with the data payload. URI-service server 200 stores 415, 417 in database 115 the data payload and the unique URL associated with the data payload.

In some embodiments, the actionable data payload may include one kilobyte or more of data and may thus be too large to encode into a machine-scannable code than can be reliably scanned by mobile devices with relatively low-fidelity scanner components (e.g., cameras with fixed-focus lenses). In such embodiments, the unique URL may consist of far less data than the actionable data payload. For example, in one embodiment, the unique URL may consist of 20 (or even fewer) characters. In many embodiments, the unique URL may consist of less than about 200 bytes of data, so that when the unique URL is encoded into a machine-scannable code (e.g., a two-dimensional barcode), the machine-scannable code will not contain more information than can be reliably captured by mobile device types with relatively low-fidelity scanner components.

In the illustrated embodiment, URI-service server 200 encodes 420 the unique URL into a machine-scannable code and sends 425 to publisher 110 the machine-scannable code with the encoded unique URL. For example, in one embodiment, URI-service server 200 may encode the unique URL into a two-dimensional barcode and send an image of the barcode to publisher 110. In other embodiments, URI-service server 200 may send the unencoded unique URL directly to publisher 110, in addition to or instead of the machine-scannable code. In some embodiments, publisher 110 may perform the encoding of the unique URL into the machine-scannable code. For example, in one embodiment, publisher 110 may receive the unique URL and encode it into one or more RFID rags.

Publisher 110 manifests 430 the machine-scannable code (encoded with the unique URL) into at least one publication 401. In some embodiments, publication 401 may comprise one of a run of printed publications, such as a magazines, flyers, brochures, catalogs, books, and the like. In such embodiments, manifesting the machine-scannable code into publication 401 may comprise printing (or causing to be printed) an image of the machine-scannable code on one or more pages of the printed publication. In other embodiments, publication 401 may comprise an electronic publication, such as a web page, e-mail message(s), instant message(s), and the like. In such other embodiments, manifesting the machine-scannable code into publication 401 may comprise including an image of the machine-scannable code (or a link to such an image) within the content of an electronic document, such as an HyperText Markup Language ("HTML") document. In still other embodiments, publication 401 may comprise an article of manufacture, in which case manifesting the machine-scannable code into publication 401 may comprise affixing an RFID (encoded with the unique URL) to the article of manufacture.

At some point, mobile device 300 encounters publication 401 and machine-scans 435 the machine-scannable code manifested therein. For example, in some embodiments, mobile device 300 may capture a picture of a machine-scannable code printed on a page of publication 401 or rendered as an electronic document on a display of a display device. In other embodiments, mobile device 300 may capture data emanating from an RFID tag affixed to publication 401. As discussed above, in some embodiments, the machine-scannable code may encode only about 20-200 bytes of data, so the machine-scannable code may be relatively easily scannable even if mobile device 300 has relatively low-fidelity scanner components.

Having obtained 440 a representation of the machine-scannable code manifested in publication 401, mobile device 300 decodes 445 the unique URL encoded in the machine-scannable code, and sends 450 a request for the unique URL to URI-service server 200.

URI-service server 200 queries 455 database 115 and retrieves 460 the actionable data payload associated with the unique URL. URI-service server 200 also determines a device type of mobile device 300. For example, in one embodiment, the request for the unique URL from mobile device 300 may include an implicit indication of the client type (e.g., a client hardware and/or software type may be indicated via an HTTP referrer header or other metadata incident to the request). In other embodiments, determining a device type of mobile device 300 may include additional communications (not shown) with mobile device 300.

Having determined a device type of mobile device 300, URI-service server 200 generates a URI including the actionable data payload, the URI being formatted so that mobile device 300 will be able to interpret and act on the data payload by invoking a non-web-browser application.

Because the URI is to invoke a non-web-browser application, in some embodiments, the URI may not be a URL (URLs being a subset of URIs). However, some device types may handle some URLs (as well as non-URL URIs) by non-web-browser applications. For example, iPhone OS/iOS devices (provided by Apple Inc. of Cupertino, Calif.) may handle URLs in the form of "http://maps.google.com/maps . . . " by invoking the Maps non-web-browser application (if present), while URLs in the form of "http://phobos.apple.com/WebObjects . . . " may be handled by the iTunes non-web-browser application.

In some embodiments, generating such a device-type-specific URI includes obtaining and using a device-type/payload-type mapping, as discussed below. In some embodiments, the generated device-type-specific URI may comprise one kilobyte or more of data.

URI-service server 200 sends 475 the device-type-specific URI to mobile device 300, which invokes 480 an appropriate non-web-browser application to handle the data payload. In other embodiments, an equivalent result may be obtained by generating and delivering an alternately-formed device-type-specific data structure in place of the device-type-specific URI, e.g. device-type-specific Extensible Markup Language ("XML") data, device-type-specific JavaScript Object Notation ("JSON") data, and the like.

Figure 5:
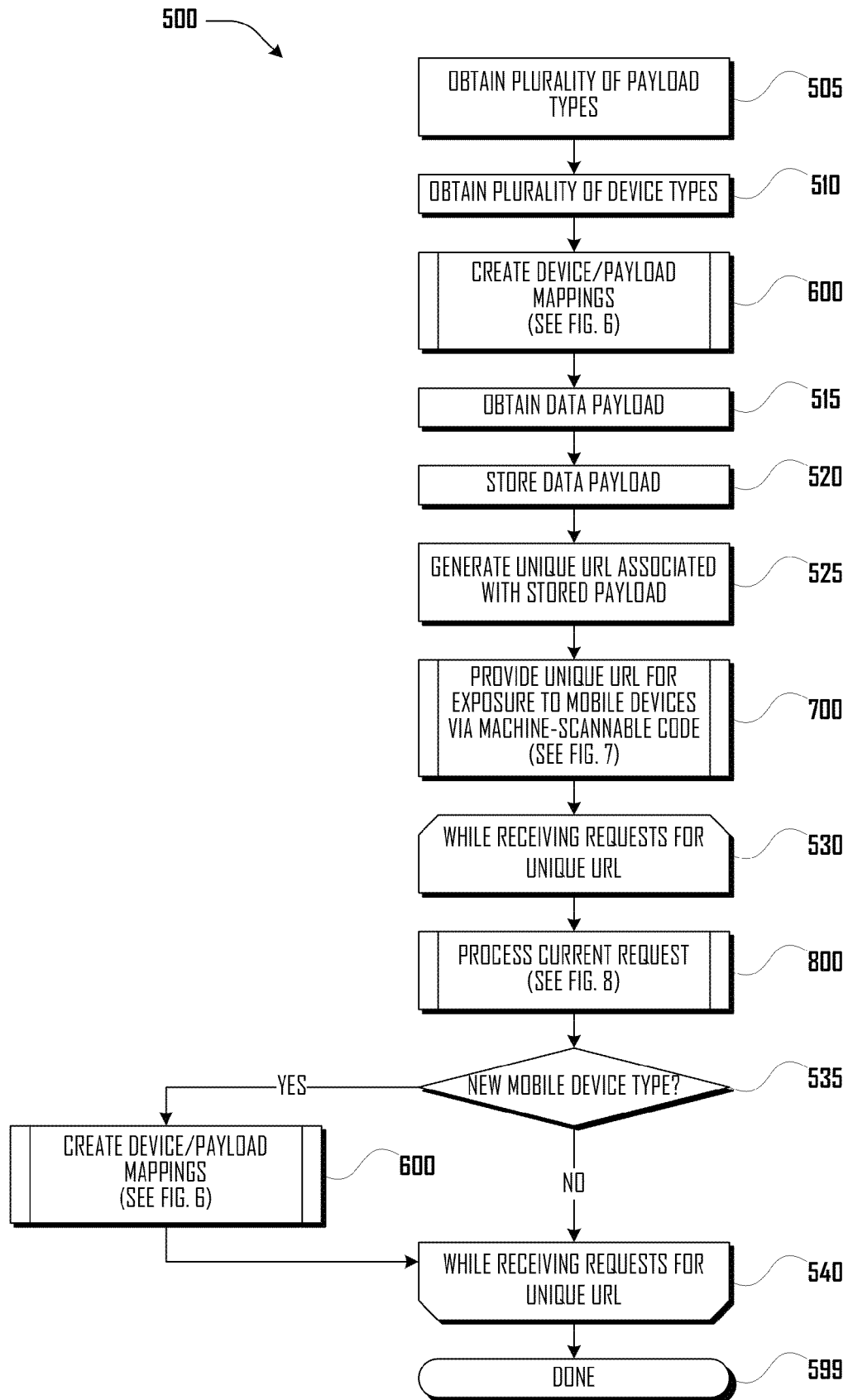
FIG. 5 illustrates a remote-application invocation routine in accordance with one embodiment.

FIG. 5 illustrates a remote-application invocation routine 500 in accordance with one embodiment. In some embodiments, routine 500 may be performed by URI-service server 200. In block 505, routine 500 obtains information related to a plurality of different payload types. For example, in one embodiment, the plurality of different payload types may include payload types such as contact information, map or geo-location information, event or appointment information, downloadable content information, and the like. The information related to the plurality of different payload types may include information such as standardized formats (if any) corresponding to the payload types, such as vCard for contact information, vCal for event/appointment information, and the like.

In block 510, routine 500 obtains information related to a plurality of different device types. For example, in one embodiment, the plurality of different device types may include device types such as the following:

iPhone OS and/or iOS devices, provided by Apple Inc. of Cupertino, Calif.;
    Android operating system devices, provided by Google Inc. of Menlo Park, Calif.;
    BlackBerry devices, provided by Research In Motion Limited of Waterloo, Ontario;
    webOS devices, provided by Palm, Inc. of Sunnyvale, Calif.;
    Symbian OS devices, provided by Nokia Corporation of Tempere, Finland;
    and the like.

In some embodiments, the information related to the plurality of different device types may also include information related to non-web-browser applications that exist on each device type for handling the different payload types, including the URL and/or URI formats that are required to invoke the non-web-browser applications on each device type.

Figure 6:
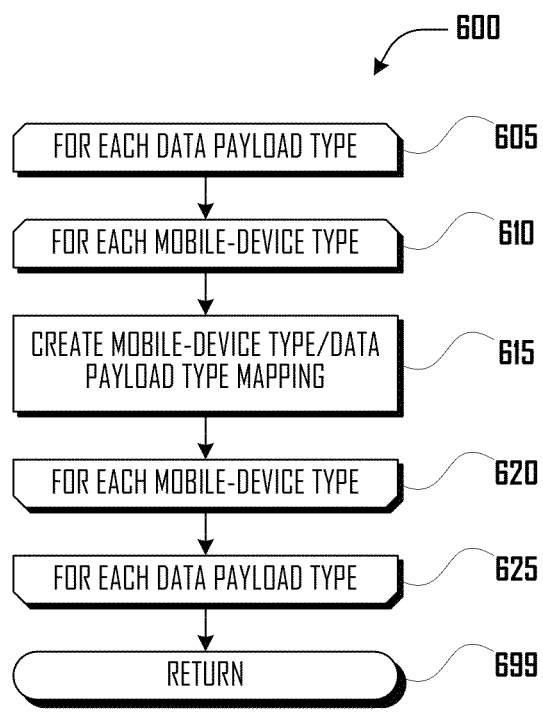
FIG. 6 illustrates an exemplary device/payload mapping subroutine, in accordance with one embodiment.

In subroutine block 600 (see FIG. 6, discussed below), routine 500 creates a set of device-type/payload-type mappings corresponding to the plurality of different payload types and the plurality of different device types. Specifically, FIG. 6 illustrates an exemplary device/payload mapping subroutine 600, in accordance with one embodiment. Beginning in starting loop block 605, subroutine 600 iterates over each data payload type, and beginning in starting loop block 610, subroutine 600 iterates over each mobile-device type. In block 615, subroutine 600 creates a mapping between the current data payload type and the current mobile-device type. For example, in one embodiment, the created mapping may indicate that for the current device/payload combination, a particular URI format should be used, including a particular URI scheme and a particular scheme-specific syntax, possibly including placeholders for various types of scheme-specific data. In ending loop block 620, subroutine 600 iterates back to block 610 to process the next mobile-device type (if any), and ending loop block 625, subroutine 600 iterates back to block 605 to process the next data payload type (if any). Subroutine 600 ends in block 699, making the created mappings available to the caller.

In one embodiment, the created mappings may be comprise executable program code for handling a particular type of actionable data payload. For example, in one embodiment, mappings for combinations of geo-location data payload types and various mobile-device types may be embodied as in the following exemplary code snippet:

```
urlagent = request.env["HTTP_USER_AGENT"]
caption = map_location.caption || map_location.search_location
case urlagent
when /(iPhone|webOS)/i
    redirect_url = "http://maps.google.com/maps?q="<<
        map_location.map_query
    redirect_url << "(#{caption})" unless caption.strip.empty?
```

-continued

```
when /(Android)/i
    redirect_url = "geo:0,0?q="<<map_location.map_query
    redirect_url << "(#{caption})" unless caption.strip.empty?
else
    redirect_url = map_location.generate_map_url(request.host,
        caption)
end
redirect_to redirect_url
```

Similarly, in one embodiment, mappings for combinations of event or appointment data payload types and various mobile-device types may be embodied as in the following exemplary code snippet:

```
phone_type = MobileType.getPhoneTypeFromAgentString(
    request.env["HTTP_USER_AGENT"] )
#Parameters for generating ics file
@vcal_params = { }
case phone_type
when MobileType::IPHONE
    #Invoke native iCalendar on IPhone
    ics_url = url_for(:only_path=>true, :overwrite_params =>
        {:action=>'generate', :format=>'ics'})
    redirect_to "webcal://#{request.host_with_port}#{ics_url}"
    return
when MobileType::WINDOWS_CE
    #Create downloadable vcs file for Windows Mobile
    redirect_to :overwrite_params => {:action=>'generate',
        :format=>'vcs'}
    return
when MobileType::SYMBIAN
    #Create downloadable vcs v1.0 file for Symbian phones
    redirect_to :overwrite_params => {:action=>'generate',
        :format=>'vcs', :mobile=>phone_type}
    return
end
```

Referring again to FIG. 5, in block 515, routine 500 obtains an actionable data payload. For example, in one embodiment, routine 500 may receive the actionable data payload from a remote publisher device (e.g., publisher 110). In other embodiments, routine 500 may obtain actionable data payload from database 115 or other local or remote data store.

As discussed above, in various embodiments, the actionable data payload may include information such as contact information (for invoking address book or contact manager applications on the plurality of different device types), geo-location information (for invoking geo-mapping applications on the plurality of different device types), event information (for invoking calendar or appointment applications on the plurality of different device types), downloadable content information (for invoking store or e-commerce applications on the plurality of different device types), and the like. In some embodiments, the actionable data payload may include one kilobyte or more of data.

In block 520, routine 500 stores the actionable data payload, e.g. in database 115 or other data store. In block 525, routine 500 generates a unique URL and associates the unique URL with the stored actionable data payload. In some embodiments, the unique URL may consist of between 20-200 bytes of data. In other embodiments, the unique URL may be larger or smaller.

In subroutine block 700 (see FIG. 7, discussed below), routine 500 provides the unique URL for exposure, via a machine-scannable code, to a plurality of mobile devices of the plurality of different device types.

Figure 7:
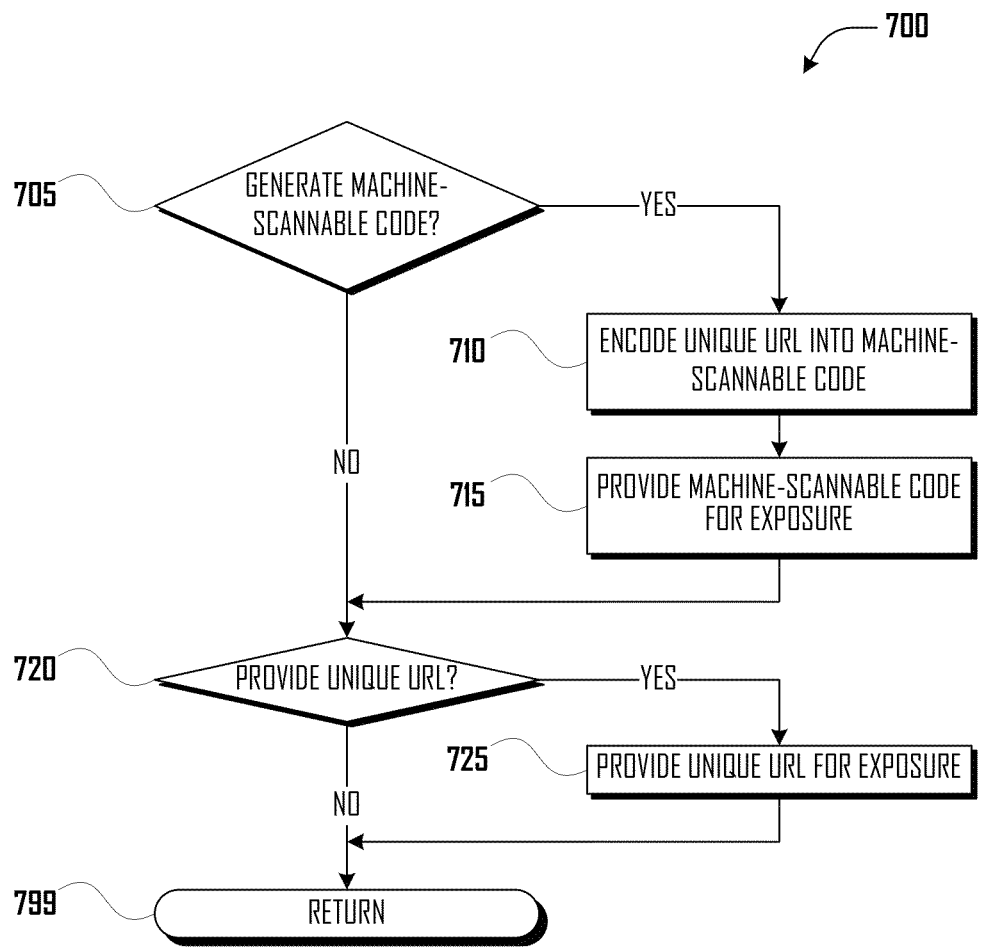
FIG. 7 illustrates an exemplary unique URL exposure subroutine, in accordance with one embodiment.

FIG. 7 illustrates an exemplary unique URL exposure subroutine 700, in accordance with one embodiment. In decision block 705, subroutine 700 determines whether to generate a machine-scannable code. In some embodiments, such as those in which the machine-scannable code is a two-dimensional barcode, subroutine 700 may encode the unique URL into the machine-scannable code in block 710 and provide the generated machine-scannable code for exposure to a plurality of mobile devices in block 715. For example, in one embodiment, subroutine 700 may encode the unique URL into a two-dimensional barcode and send an image of the barcode to a remote device (e.g., publisher 110) for printing into printed publications, embedding into electronic documents, and the like, which publications and/or electronic documents may be subsequently exposed to a plurality of mobile devices of differing device types. However, in other embodiments, subroutine 700 may determine not to generate a machine-scannable code, leaving this task to a remote device (e.g., publisher 110).

In decision block 720, subroutine 700 determines whether to provide the unique URL. In some embodiments, such as those in which subroutine 700 has generated and provided the machine-scannable code in block 710-715, subroutine 700 may not need to also provide the unique URI. In other embodiments, including those in which subroutine 700 determined not to generate a machine-scannable code in block 705, subroutine 700 may in block 725 provide the unique URL to a remote device (e.g., publisher 110) for encoding into a machine-scannable code and subsequent exposure to a plurality of mobile devices of differing device types. Subroutine 700 ends in block 799.

Referring again to FIG. 5, beginning in starting loop block 530, routine 500 processes an ongoing series of requests for the unique URL from mobile devices of differing device types, the mobile devices having obtained the unique URL by scanning manifestations of a machine-scannable code to which the mobile devices were exposed. For example, in various embodiments, the mobile devices may have been exposed to printed publications or rendered electronic documents including images of a two-dimensional barcode encoded with the unique URL, articles of manufacture with affixed RFID tags encoded with the unique URL, and the like.

In subroutine block 800 (see FIG. 8, discussed below), routine 500 processes the current request for the unique URL from the current requesting mobile device.

From time to time, routine 500 may obtain information about a new mobile device type that was not previously known at the time the unique URL was generated and associated with the actionable data payload. In decision block 535, routine 500 determines whether any such new device information has been obtained. If not, in block 540 routine 500 iterates back to block 530 to process the next request for the unique URL (if any). If information about one or more new mobile devices has been obtained, then in subroutine block 600 (see discussion of FIG. 6, above), routine 500 creates new device/payload mappings for each new combination of mobile device type and payload type, then in block 540, iterates back to block 530 to process the next request for the unique URL (if any). After all requests for the unique URL have been processed, routine 500 ends in block 599.

Figure 8:
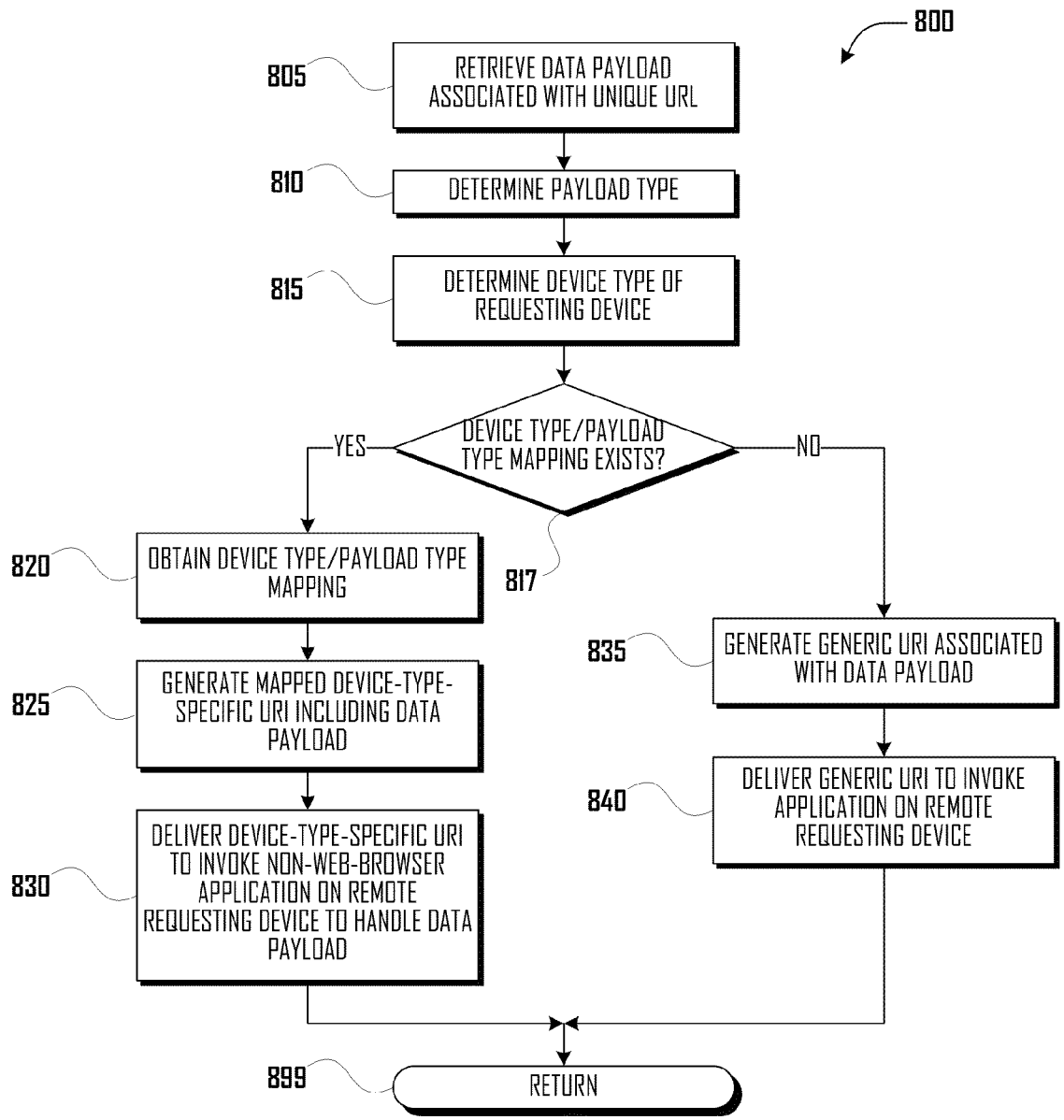
FIG. 8 illustrates an exemplary unique-URL-request processing subroutine, in accordance with one embodiment.

FIG. 8 illustrates an exemplary unique-URL-request processing subroutine 800, in accordance with one embodiment. In block 805, subroutine 800 retrieves (e.g., by querying database 115 according to the unique URL) the actionable data payload associated with the unique URL. In block 810, subroutine 800 determines which of the plurality of different payload types corresponds to the actionable data payload associated with the unique URL.

In block 815, subroutine 800 determines a device type of the mobile device that issued the request currently being processed. For example, in one embodiment, the request for the unique URL from the mobile device may include an implicit indication of the client type (e.g., a client hardware and/or software type may be indicated via an HTTP referrer header or other metadata incident to the request). In other embodiments, determining a device type of the requesting mobile device may include additional communications with the mobile device.

In decision block 817, subroutine 800 determines whether the determined device type of the requesting mobile device is known and a device-type/payload-type mapping exists. If so, in block 820, subroutine 800 obtains the mapping corresponding to the determined device type of the requesting mobile device and the determined payload type of the actionable data payload associated with the requested unique URL.

In block 825, subroutine 800 generates a device-type-specific URI including the actionable data payload. The URI is formatted so that the requesting mobile device will be able to interpret and act on the data payload by invoking a suitable non-web-browser application.

In block 830, subroutine 800 delivers the device-type-specific URI to the requesting mobile device, where a URI handling routine will invoke a non-web-browser application to handle the actionable data payload included in the device-type-specific URI. For example, depending on the payload type, the requesting mobile device may act on the actionable data payload by adding (or prompting to add) a contact to a contacts list, adding (or prompting to add) an event or appointment to a calendar or event list, opening a mapping application to a geo-location, downloading (or prompting to download) downloadable content from a store or other content-downloading application, and the like.

On the other hand, if in decision block 817, subroutine 800 determines that the determined device type of the requesting mobile device is not known and/or that a device-type/payload-type mapping does not exist, then in block 835, subroutine 800 may generate a generic URI according to the data payload type and in block 840, deliver the generic URI to the requesting mobile device. For example, in one embodiment, for a geo-location-type payload, subroutine 800 may generate an image of a map targeting a particular geo-location and deliver a URI of the image to the requesting mobile device to be handled by a web browser or other image-handling application. For another example, in one embodiment, for an event or appointment payload, subroutine 800 may generate a web page including event or appointment details, and deliver the URI of the web page to the requesting mobile device to be handled by a web browser. Similarly, in one embodiment, for contact information payload, subroutine 800 may generate a web page including contact details, and deliver the URI of the web page to the requesting mobile device to be handled by a web browser.

Subroutine 800 ends in block 899.

Figure 9:
FIG. 9 illustrates a SPARQCode™ two-dimensional barcode, such as may be employed as a machine-scannable code in various embodiments in one embodiment.

FIG. 9 illustrates a SPARQCode™ two-dimensional barcode 900, such as may be employed as a machine-scannable code in various embodiments. Two-dimensional barcode 900 follows the SPARQCode™ encoding standard, which was developed by the assignee of the present application. Per the SPARQCode™ encoding standard, barcode 900 includes several components:

- a source-identifier 920;
- a non-machine-readable pictogram 905 indicating a payload type of the actionable data payload associated with barcode 900;
- a caption 910, providing brief human-readable information about the data payload associated with barcode 900; and
- a QR Code 915 encoded with a unique URL associated with a data payload.

QR Code 915 encodes the unique URL as a binary data stream according to standards defined by DENSO Corporation (of Kariya, Aichi, Japan) in ISO/IEC 18004. However, ISO/IEC 18004 lacks an encoding standard for interpreting the data stream on the application layer for decoding various data payload types, as discussed herein. The SPARQCode™ encoding standard specifies common formats for the interpretation of different data payload types at the application layer.

In the illustrated embodiment, non-machine-readable pictogram 905 indicates that the geo-location or map data is the payload type of the actionable data payload associated with the unique URL encoded in QR Code 915. The SPARQCode™ standard specifies additional pictograms indicating various other actionable data payload types, including contact information, appointment or event information, web address information, raw data, and the like.

Figure 10:
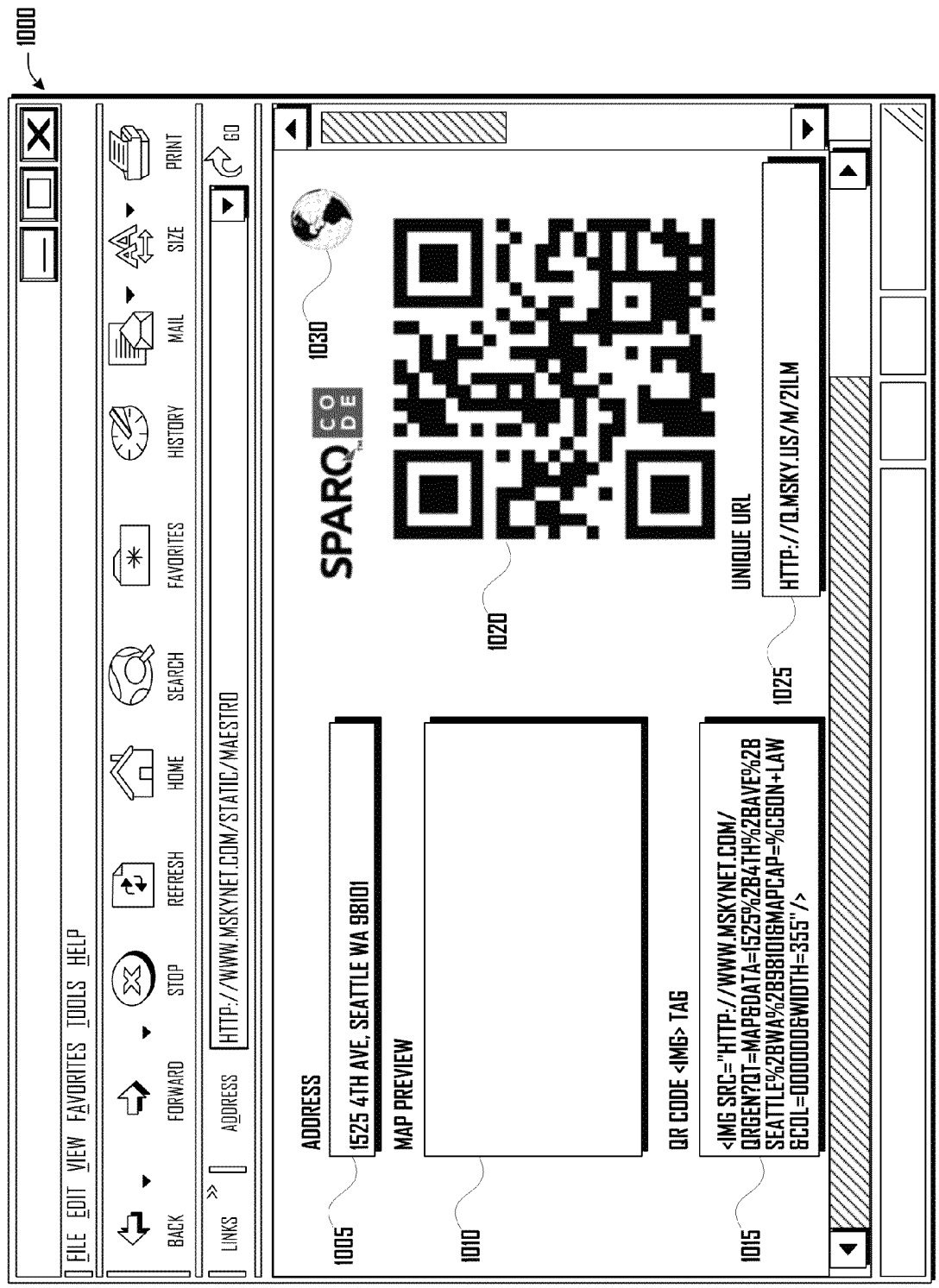
FIG. 10 illustrates a web application, such as may be provided by URI-service server in one embodiment, for handling a geo-location payload.
Figure 11:
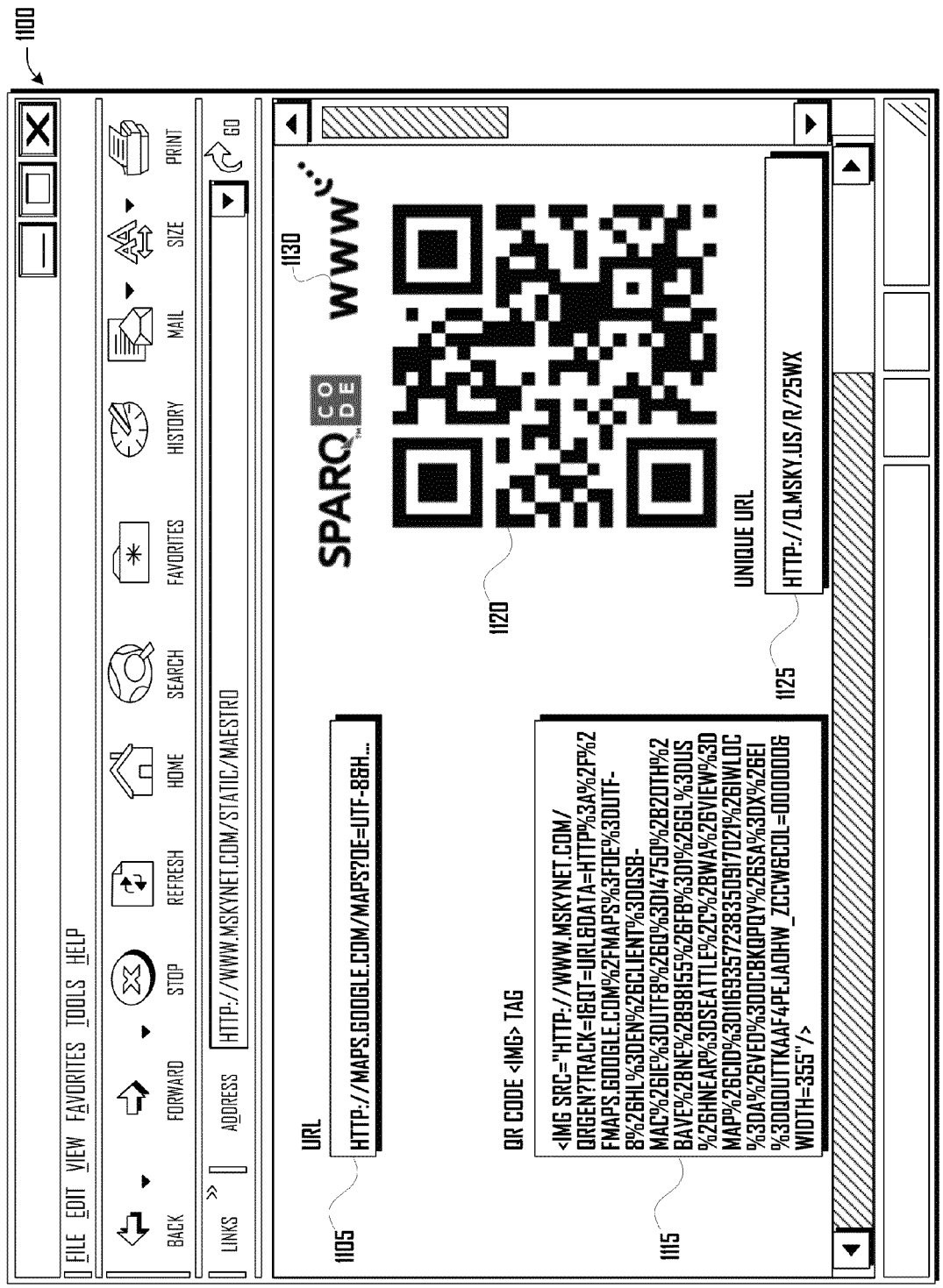
FIG. 11 illustrates a web application, such as may be provided by URI-service server, for handling a URL payload.
Figure 12:
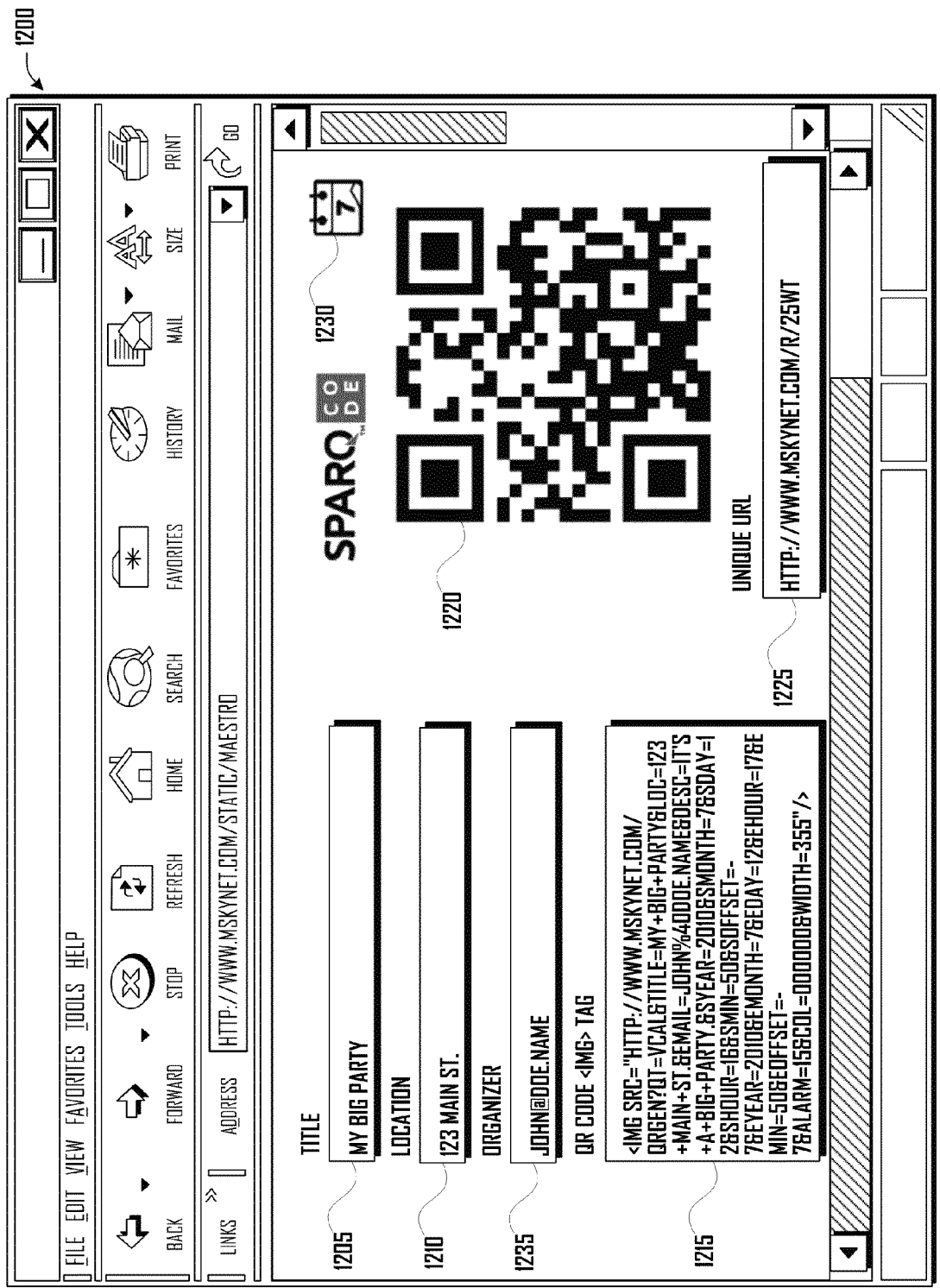
FIG. 12 illustrates a web application, such as may be provided by URI-service server in one embodiment, for handling an event or appointment payload.

FIGS. 10-12 illustrate exemplary interfaces 1000, 1100, 1200, such as may be used to obtain actionable data payloads (e.g. from publisher 110 to URI-service server 200) and provide machine-scannable codes and/or unique URLs (e.g. from URI-service server 200 to publisher 110) for subsequent exposure to mobile devices of differing device types, in accordance with various embodiments.

FIG. 10 illustrates a web application 1000, such as may be provided by URI-service server 200, for handling a geo-location payload. A user (e.g. a user of publisher device 110) provides an address 1005 (or otherwise specifies a geo-location) as an actionable payload. In other embodiments, web application 1000 may allow for entry of additional payload data (not shown), such as captions, map labels, directions, and the like. In response to payload input, the web application provider automatically, dynamically generates and provides to the user a unique URL 1025 associated with the payload, a two-dimensional barcode 1020 (including a non-machine-readable, payload-type-indicative pictogram 1030), an embeddable URL 1015 to an image corresponding to two-dimensional barcode 1020, and a preview 1010 of the geo-location on a map.

FIG. 11 illustrates a web application 1100, such as may be provided by URI-service server 200, for handling a URL payload. A user (e.g. a user of publisher device 110) provides a URL 1105 as an actionable payload (on some devices, notable iOS/iPhone OS devices, certain URLs may be handled by non-web-browser applications). In other embodiments, web application 1100 may allow for entry of additional payload data (not shown), such as captions and the like. In response to payload input, the web application provider automatically, dynamically generates and provides to the user a unique URL 1125 associated with the payload, a two-dimensional barcode 1120 (including a non-machine-readable, payload-type-indicative pictogram 1130), and an embeddable URL 1115 to an image corresponding to two-dimensional barcode 1120.

FIG. 12 illustrates a web application 1200, such as may be provided by URI-service server 200, for handling an event or appointment payload. A user (e.g. a user of publisher device 120) provides an actionable payload, including a title 1205, location 1210, organizer 1235. In other embodiments, web application 1200 may allow for entry of additional payload data (not shown), such as captions, start and/or stop times, alarms, directions, and the like. In response to payload input, the web application provider automatically, dynamically generates and provides to the user a unique URL 1225 associated with the payload, a two-dimensional barcode 1220 (including a non-machine-readable, payload-type-indicative pictogram 1230), and an embeddable URL 1215 to an image corresponding to two-dimensional barcode 1220.

Tables 1-5, below, illustrate unique URLs and device-type-specific URIs for an exemplary geo-location payload type and an exemplary event/appointment payload type according to various embodiments.

For example, in one embodiment, an exemplary geo-location data payload (here, referring to the Pike Place Market in Seattle, Wash.) may be associated with an exemplary unique URL (e.g., "http://q.msky.us/m/267S"), which may be mapped to device-type-specific URIs as set out in Table 1, below.

TABLE 1

| Device type | device-type-specific URI |
|---|---|
| iPhone | http://maps.google.com/maps?q=Pike%20Place%20Market,%20Seattle,%20WA,%20USA%28pike+place+market+seattle%29 |
| Android | geo:0,0?q=Pike Place Market, Seattle, WA, USA(pike+place+market+seattle) |
| webOS | http://maps.google.com/maps/m?q=Pike+Place+Market,+Seattle,+WA,+USA%28pike+place+market+seattle%29 |

To handle the device-type-specific URIs listed in Table 1, a requesting device of one of the device types set out in Table 1 would invoke a local mapping application to handle the indicated device-type-specific URI.

However, in alternate embodiments, other device types may not allow for invocation of a local mapping application on the requesting device. For example, in one embodiment set out in Table 2, for certain device types, a device-type-specific URI may resolve to a dynamically-generated image of a map showing the geo-location specified by the data payload.

TABLE 2

| Device type | device-type-specific URI |
|---|---|
| Windows Mobile; Symbian OS; Blackberry | http://q.msky.us/cgi-bin/map_tre.cgi?zoom=14&maptype=mobile&center=47.6101359,-122.3420567&markers=47.6101359,-122.3420567,blueg&cap=pike%2Bplace%2Bmarket%2Bseattle&size=350×280 |

For another example, in one embodiment, an exemplary calendar-event data payload (here, referring to an event celebrating the 58th Birthday of the Barcode) associated with an exemplary unique URL (e.g., "http://www.mskynet.com/r/MNN") may be mapped to device-type-specific URIs as set out in Table 3, below.

TABLE 3

| Device type | device-type-specific URI |
|---|---|
| iPhone/iOS | webcal://www.mskynet.com/vcal/generate?alarm=15&desc=Barcode%27s+58th+Birthday%21&end=2010-10-07T21%3A30%3A00%2B00%3A00&format=ics&from=noreply%40mskynet.com&loc=Seattle%2C+WA&start=2010-10-07T20%3A30%3A00%2B00%3A00&title=Birthday |

TABLE 3-continued

| Device type | device-type-specific URI |
|---|---|
| Windows Mobile | http://www.mskynet.com/vcal/generate?alarm=15&desc=Barcode%27s+58th+Birthday%21&end=2010-10-07T21%3A30%3A00%2B00%3A00&format=vcs&from=noreply%40mskynet.com&loc=Seattle%2C+WA&start=2010-10-07T20%3A30%3A00%2B00%3A00&title=Birthday |
| Symbian OS | http://www.mskynet.com/vcal/generate?alarm=15&desc=Barcode%27s+58th+Birthday%21&end=2010-10-07T21%3A30%3A00%2B00%3A00&format=vcs&from=noreply%40mskynet.com&loc=Seattle%2C+WA&mobile=symbian&start=2010-10-07T20%3A30%3A00%2B00%3A00&title=Birthday |

To handle the device-type-specific URIs listed in Table 3, a requesting device of one of the device types set out in Table 3 would make a request to the indicated device-type-specific URI and invoke a local calendaring application to handle the resultant iCalendar data (see Table 5, discussed below).

However, in alternate embodiments involving other device types, a local calendaring application may be invoked indirectly, such as by emailing iCalendar data to an email address associated with the requesting device. Consequently, the device-type-specific URIs set forth in Table 4, below, may resolve to a web page that prompts for an email address to which iCalendar data would then be emailed, subsequently invoking a local calendaring application on the receiving device.

TABLE 4

| Device type | device-type-specific URI |
|---|---|
| Blackberry | http://www.mskynet.com/vcal/email?alarm=15&desc=Barcode%27s+58th+Birthday!&end=2010-10-07T21%3A30%3A00%2B00%3A00&from=noreply%40mskynet.com&loc=Seattle%2C+WA&mobile=blackberry&start=2010-10-07T20%3A30%3A00%2B00%3A00&title=Birthday&vcal_format=ics |
| Android | http://www.mskynet.com/vcal/email?alarm=15&desc=Barcode%27s+58th+Birthday!&end=2010-10-07T21%3A30%3A00%2B00%3A00&from=noreply%40mskynet.com&loc=Seattle%2C+WA&mobile=andriod&start=2010-10-07T20%3A30%3A00%2B00%3A00&title=Birthday&vcal_format=ics |
| webOS | http://www.mskynet.com/vcal/email?alarm=15&desc=Barcode%27s+58th+ Birthday!&email=yowhan%40gmail.com&end=2010-10-07T21%3A30%3A00%2B00%3A00&from=noreply%40mskynet.com&loc=Seattle%2C+WA&mobile=palm&start=2010-10-07T20%3A30%3A00%2B00%3A00&title=Birthday&vcal_format=ics |

Table 5 shows various device-type-specific iCalendar payloads that may be delivered to requesting devices of various types according to the device-type-specific URIs set out in Table 3 and Table 4. The various iCalendar data payloads set out in Table 5 would ultimately be handled by a local calendaring application on the requesting device of the indicated type.

TABLE 5

| Device type | device-type-specific iCalendar data |
|---|---|
| iPhone/iOS; Android; webOS | BEGIN:VCALENDAR<br>METHOD:PUBLISH<br>PRODID:-//MSKYNET, Inc.//EN<br>VERSION:2.0<br>X-WR-CALNAME:Birthday<br>CALSCALE:GREGORIAN<br>BEGIN:VEVENT<br>DTSTART:20101007T203000Z<br>DTEND:20101007T213000Z<br>DTSTAMP:20100715T054408Z<br>ORGANIZER;CN=:MAILTO:noreply@mskynet.com<br>CLASS:PUBLIC<br>CREATED:20100715T054408Z<br>SUMMARY:Birthday<br>DESCRIPTION:Barcode's 58th Birthday!<br>LAST-MODIFIED:20100715T054408Z<br>LOCATION:Seattle, WA<br>SEQUENCE:0<br>TRANSP:OPAQUE<br>BEGIN:VALARM<br>ACTION:DISPLAY<br>TRIGGER:-PT15M<br>END:VALARM<br>END:VEVENT<br>END:VCALENDAR |
| Blackberry | BEGIN:VCALENDAR<br>METHOD:REQUEST<br>PRODID:-//MSKYNET, Inc.//EN<br>VERSION:2.0<br>X-WR-CALNAME:Birthday<br>CALSCALE:GREGORIAN<br>BEGIN:VEVENT<br>DTSTART:20101007T203000Z<br>DTEND:20101007T213000Z<br>DTSTAMP:20100715T062837Z<br>ORGANIZER;CN=:MAILTO:noreply@mskynet.com<br>CLASS:PUBLIC<br>CREATED:20100715T062837Z<br>SUMMARY:Birthday<br>DESCRIPTION:Barcode's 58th Birthday!<br>LAST-MODIFIED:20100715T062837Z<br>LOCATION:Seattle, WA<br>SEQUENCE:0 |

TABLE 5-continued

| Device type | device-type-specific iCalendar data |
|---|---|
|  | TRANSP:OPAQUE |
|  | BEGIN:VALARM |
|  | ACTION:DISPLAY |
|  | TRIGGER:-PT15M |
|  | END:VALARM |
|  | END:VEVENT |
|  | END:VCALENDAR |
| Symbian | BEGIN:VCALENDAR |
|  | METHOD:PUBLISH |
|  | PRODID:-//MSKYNET, Inc.//EN |
|  | VERSION:1.0 |
|  | X-WR-CALNAME:Birthday |
|  | CALSCALE:GREGORIAN |
|  | BEGIN:VEVENT |
|  | DTSTART:20101007T203000Z |
|  | DTEND:20101007T213000Z |
|  | DTSTAMP:20100715T063717Z |
|  | ORGANIZER;CN=:MAILTO:noreply@mskynet.com |
|  | CLASS:PUBLIC |
|  | CREATED:20100715T063717Z |
|  | SUMMARY:Birthday |
|  | DESCRIPTION:Barcode's 58th Birthday! |
|  | LAST-MODIFIED:20100715T063717Z |
|  | LOCATION:Seattle, WA |
|  | SEQUENCE:0 |
|  | TRANSP:OPAQUE |
|  | END:VEVENT |
|  | END:VCALENDAR |
| Windows Mobile | BEGIN:VCALENDAR |
|  | METHOD:PUBLISH |
|  | PRODID:-//MSKYNET, Inc.//EN |
|  | VERSION:2.0 |
|  | X-WR-CALNAME:Birthday |
|  | CALSCALE:GREGORIAN |
|  | BEGIN:VEVENT |
|  | DTSTART:20101007T203000Z |
|  | DTEND:20101007T213000Z |
|  | DTSTAMP:20100715T055225Z |
|  | ORGANIZER;CN=:MAILTO:noreply@mskynet.com |
|  | CLASS:PUBLIC |
|  | CREATED:20100715T055225Z |
|  | SUMMARY:Birthday |
|  | DESCRIPTION:Barcode's 58th Birthday! |
|  | LAST-MODIFIED:20100715T055225Z |
|  | LOCATION:Seattle, WA |
|  | SEQUENCE:0 |
|  | TRANSP:OPAQUE |
|  | BEGIN:VALARM |
|  | ACTION:DISPLAY |
|  | TRIGGER:-PT15M |
|  | END:VALARM |
|  | END:VEVENT |
|  | END:VCALENDAR |

Although Tables 3-5 refer to an exemplary event payload delivered in the iCalendar data format, in other embodiments, the methods disclosed herein may be similarly adapted to other payload data types and data delivery formats.

Figure 13:
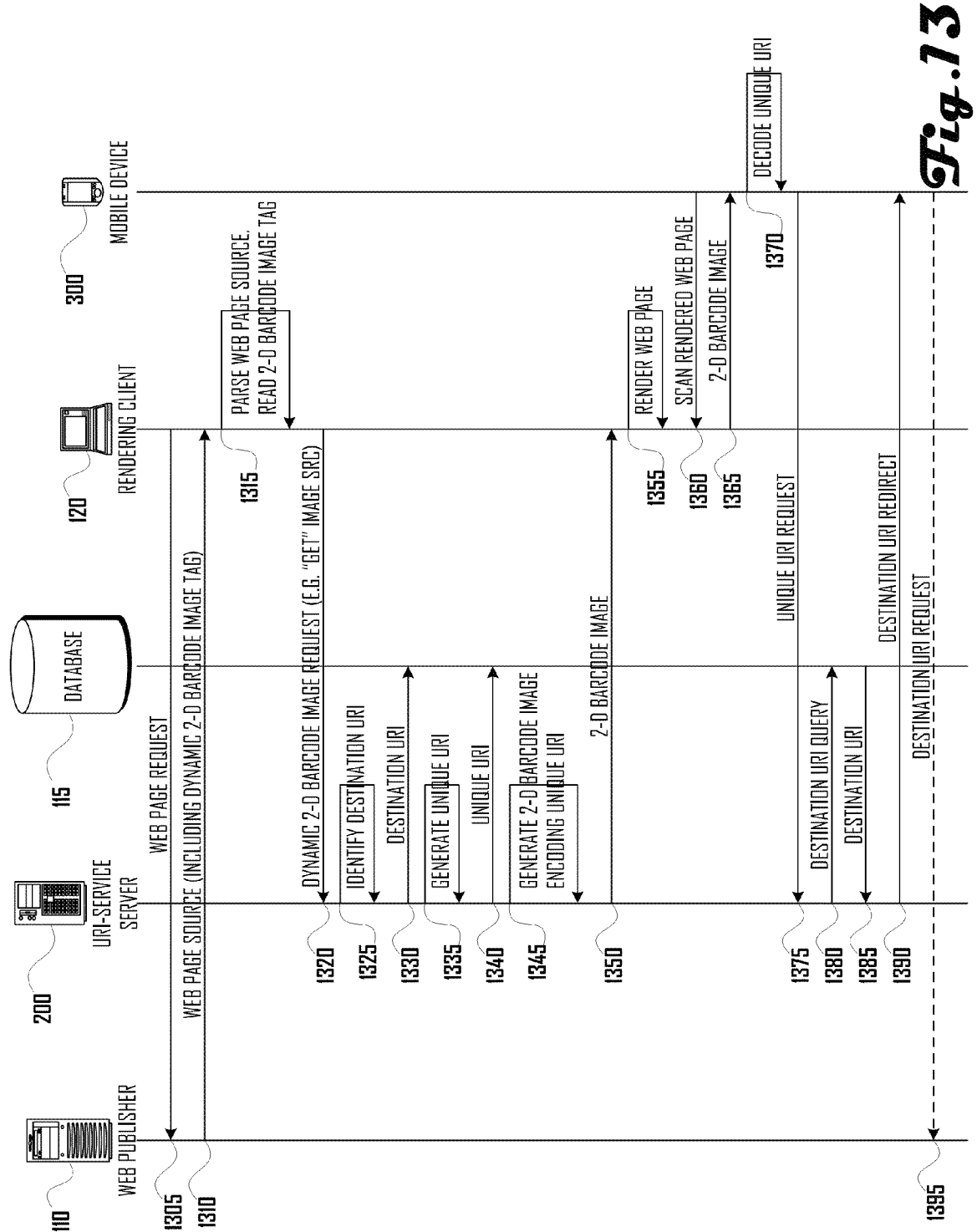
FIG. 13 illustrates an sequence of data communications for an exemplary dynamic machine-scannable-code generation and URI-handling scenario, in accordance with one embodiment.

FIG. 13 illustrates a sequence of data communications for an exemplary dynamic machine-scannable-code generation and URI-handling scenario, in accordance with one embodiment. Rendering client 120 (e.g. a personal computer, or other computing device capable of rendering a web page) sends a web page request 1305 to publisher 110. In response, publisher 110 sends source 1310 for the requested web page, typically a document including text that has been marked up in a markup language such as HTML, eXtensible Hypertext Markup Language ("XHTML"), XML, or the like. The source document includes a markup tag for including in the rendered web page an image, sourced from URI-service server 200, of a machine-scannable code, such as a barcode or two-dimensional barcode. For example, in one embodiment, an HTML document may include an <img> tag having a "src" attribute specifying a dynamic image resource hosted by URI-service server 200, e.g.
<img src="http://www.sparqcode.com/qrgen?qt=url&data=http%3A%2F%2Fxkcd.com"/>

Rendering client 120 parses 1315 the source document and reads the image tag for the machine-scannable code. When rendering the page, rendering client 120 sends a single request 1320 to URI-service server 200 for the specified image resource. For example, in one embodiment, rendering client 120 may send a "GET" request for the specified image resource to URI-service server 200 via the Hypertext Transfer Protocol ("HTTP").

URI-service server 200 parses the request and identifies 1325 a destination URI (which may be a URL) specified by the request. For example, in one embodiment, URI-service server 200 may receive a request including one or more name/value pairs, such as "qt=url" and/or "data=http%3A%2F%2Fxkcd.com", and the destination URL may be the value specified by a particular name, e.g. "data". In some embodiments, URI-service server 200 may have a publicly available application programming interface ("API") defining the name/value pair to use to indicate a destination URL. In various embodiments, the request may include additional name/value pairs that may affect various parameters of the requested machine-scannable-code image. URI-service server 200 stores the identified destination URI in database 115. In some embodiments, the destination URI may identify a resource hosted by publisher 110. In other embodiments, the destination URI may identify a resource hosted by another web server (not shown).

URI-service server 200 generates 1335 a unique URI (which may be a URL) corresponding to the identified destination URI. In some embodiments, if the identified destination URI has been previously requested, URI-service server 200 may alternatively retrieve a previously generated unique URI from database 115. In other embodiments, URI-service server 200 may generate a new unique URI for some or all subsequent requests for an identified destination URI. URI-service server 200 associates 1340 the generated unique URI (if generated) with the identified destination URI in database 115.

URI-service server 200 generates 1345 a machine-scannable-code image with the unique URI encoded therein. For example, in some embodiments, URI-service server 200 may generate a two-dimensional barcode, such as those illustrated in FIGS. 9-12, discussed above. In alternate embodiments, if the unique URI has previously been encoded into a machine-scannable-code, URI-service server 200 may retrieve a stored copy of the previously generated machine-scannable-code image from database 115.

URI-service server 200 delivers 1350 the machine-scannable-code image to rendering client 120, which inserts the image into the web page it is rendering 1355 and displays the rendered web page on a display associated with the rendering client 120.

At some point while the machine-scannable-code image is displayed on a display associated with the rendering client 120, a mobile device 300 scans 1360 the rendered web page with a machine-scannable-code scanner (e.g., a camera component and a barcode- or two-dimensional barcode-reading application) to obtain a facsimile of the machine-scannable-code image 1365. Mobile device 300 decodes 1370 the unique URI encoded in the machine-scannable-code image and sends a request 1375 for the unique URI to URI-service server 200.

URI-service server 200 receives the request and sends a query 1380 to database 115 to retrieve the destination URI 1385 corresponding to the requested unique URI. URI-service server 200 then responds to the unique-URI-request with a redirect 1390 to the destination URI. Mobile device 300 then sends a request 1395 for the destination URI to publisher 110 (if the destination URI identifies a resource hosted by publisher 110) or to another web server hosting the resource identified by the destination URI.

Thus, as illustrated in the scenario described above, any destination URL or other URI (of any length) can be converted to a compact, unique URL (or other URI) encoded into a two-dimensional barcode image (or other machine-scannable-code image) simply by including an image tag directing URI-service server 200, via a single resource request, to generate a unique URI and encode it into a dynamically-generated machine-scannable-code image.

Figure 14:
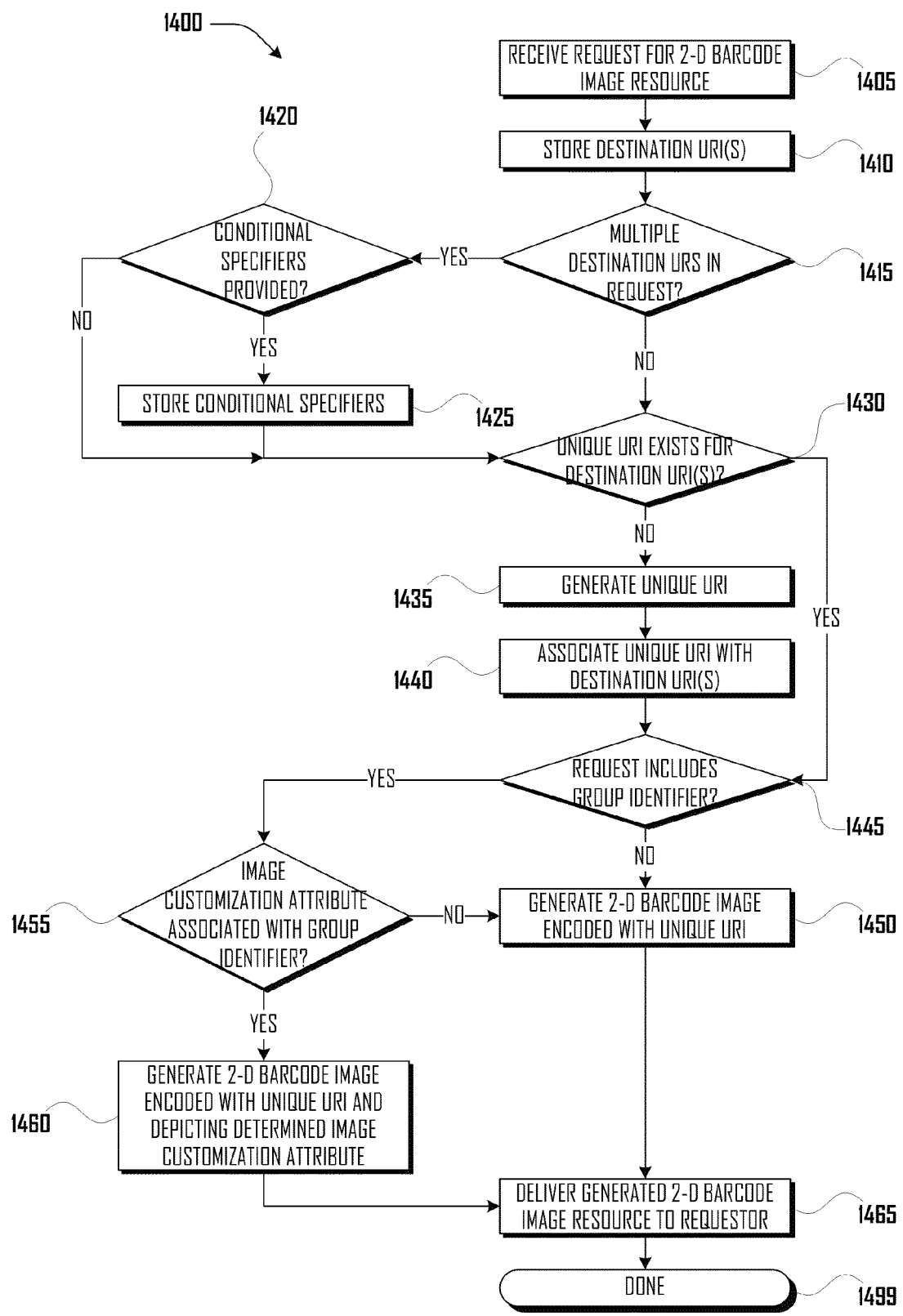
FIG. 14 illustrates a dynamic machine-scannable-code generation routine, such as may be performed by URI-service server in accordance with one embodiment.

FIG. 14 illustrates a dynamic machine-scannable-code generation routine 1400, such as may be performed by URI-service server 200 in accordance with one embodiment. In block 1405, routine 1400 receives a request for a machine-scannable-code image resource, the request specifying one or more destination URIs (or URLs). For example, in one embodiment, routine 1400 may receive a request including one or more name/value pairs, such as "qt=url", "data1=http%3A%2F%2Fxkcd.com", and/or "data2=http%3A%2F%2Fboingboing.com".

In decision block 1410, routine 1400 stores the one or more received destination URI(s) (e.g., in database 115). In block 1415, routine 1400 determines whether more than one destination URI was specified by the request. If not, routine 1400 proceeds to block 1430 (discussed below). If, however, the request specified more than one destination URI, then in decision block 1420, routine 1400 determines whether explicit conditional specifiers were provided for the two or more destination URIs. For example, in some embodiments, the request may include two or more additional name/value pairs specifying conditions associated with the two or more destination URIs.

For example, in one embodiment, a request may include one destination URI identifying an iPhone version of a particular application, and a second destination URI identifying an Android version of the particular application. In this exemplary embodiment, the request may further include name/value pairs such as "device1=iphone" and "device2=android", which act as conditional specifiers for the first and second destination URIs. For example, the conditional specifier "iphone" may indicate that when a machine-scannable-code generated in response to the request is scanned by an iPhone device, the device may be redirected to the first destination URI, whereas if the machine-scannable-code is scanned by an Android device, the device may be redirected to the second destination URI.

In other embodiments, the request may specify time-based conditional specifiers, such as "day1=MTWRF" and "day2=SS", which may indicate that a first destination URI is associated with weekdays, while a second destination URI is associated with weekend days. Similarly, in some embodiments, the request may specify location-based conditional specifiers, such as "state1=WA,CA" and "state2=OR, ID", which may indicate that a first destination URI is associated with the states of Washington and California, while a second destination URI is associated with Oregon and Idaho. Similarly, in some embodiments, the request may specify location-based conditional specifiers, such as "zip1=98101" and "zip2=98028", which may indicate that a first destination URI is associated with the zip code 98101, while a second destination URI is associated with the zip code 98028. In other embodiments, other types of conditional specifier may be specified.

If the request specifies such conditional specifiers, then in block 1425, routine 1400 stores the conditional specifiers (e.g., in database 115) in association with their respective destination URIs.

However, in other embodiments, a distinction between different application platforms may be inherent in the destination URLs and/or distinctions between multiple destination URIs may be implicitly determinable based on the destination URLs themselves. For example, in one embodiment, a first destination URI may specify a first country-code top-level domain, while a second destination URI may specify a first country-code top-level domain. In such an embodiment, it may be implicit in the destination URIs that when a machine-scannable-code generated in response to the request is scanned by a device in the first country, the device may be redirected to the first destination URI, but a device in the second country may be redirected to the second destination URI, and so forth. Similar implicit determinations may be made for various other types of destination URIs, such as destination URIs that identify geographical coordinates or other location-based information (e.g., country, state, city, neighborhood, block, and the like). In such embodiments, devices may be redirected to the destination URI identifying the nearest coordinate or location. In such and similar embodiments, the request may not include explicit conditional specifiers, in which case, routine 1400 may proceed from decision block 1420 directly to block 1430.

In decision block 1430, routine 1400 determines whether a unique URI corresponding to the destination URI (or to the group of destination URIs) already exists. If so, then routine 1400 proceeds to block 1445. If not, then in block 1435, routine 1400 generates a unique URI corresponding to the destination URI(s) and, in block 1440, associates the generated unique URI with the destination URI(s) (e.g., in database 115). In some embodiments, routine 1400 may omit decision block 1430, generating a new unique URI for every machine-scannable-code generated, regardless of whether other previously-generated unique URIs are also associated with the destination URI(s).

In block 1445, routine 1400 determines whether the request includes a group identifier. For example, in one embodiment, the request may include a name/value pair such as "group=123". If not, then routine 1400 proceeds to block 1450, discussed below. If the request includes a group identifier, then in decision block 1455, routine 1400 determines whether the group identifier has one or more associated image customization attributes. For example, in various embodiments, a group identifier may be associated with one or more customized attributes such as image size, image color, image caption (or other text string), non-scannable logo, and the like.

If the group identifier has no associated image customization attributes, then routine 1400 proceeds to block 1450, discussed below. However, if the group identifier has one or more associated image customization attributes, then in block 1460, routine 1400 generates a machine-scannable-code image encoded with the unique URI according to the one or more associated image customization attributes.

In block 1450, routine 1400 generates a machine-scannable-code image encoded with the unique URI according to one or more default image attributes (e.g., in a default color, in a default size, with a default caption, with a default non-scannable logo, and the like).

In block 1465, routine 1400 delivers the generated machine-scannable-code image to the requestor for rendering to a display. Routine 1400 ends in block 1499.

Figure 15:
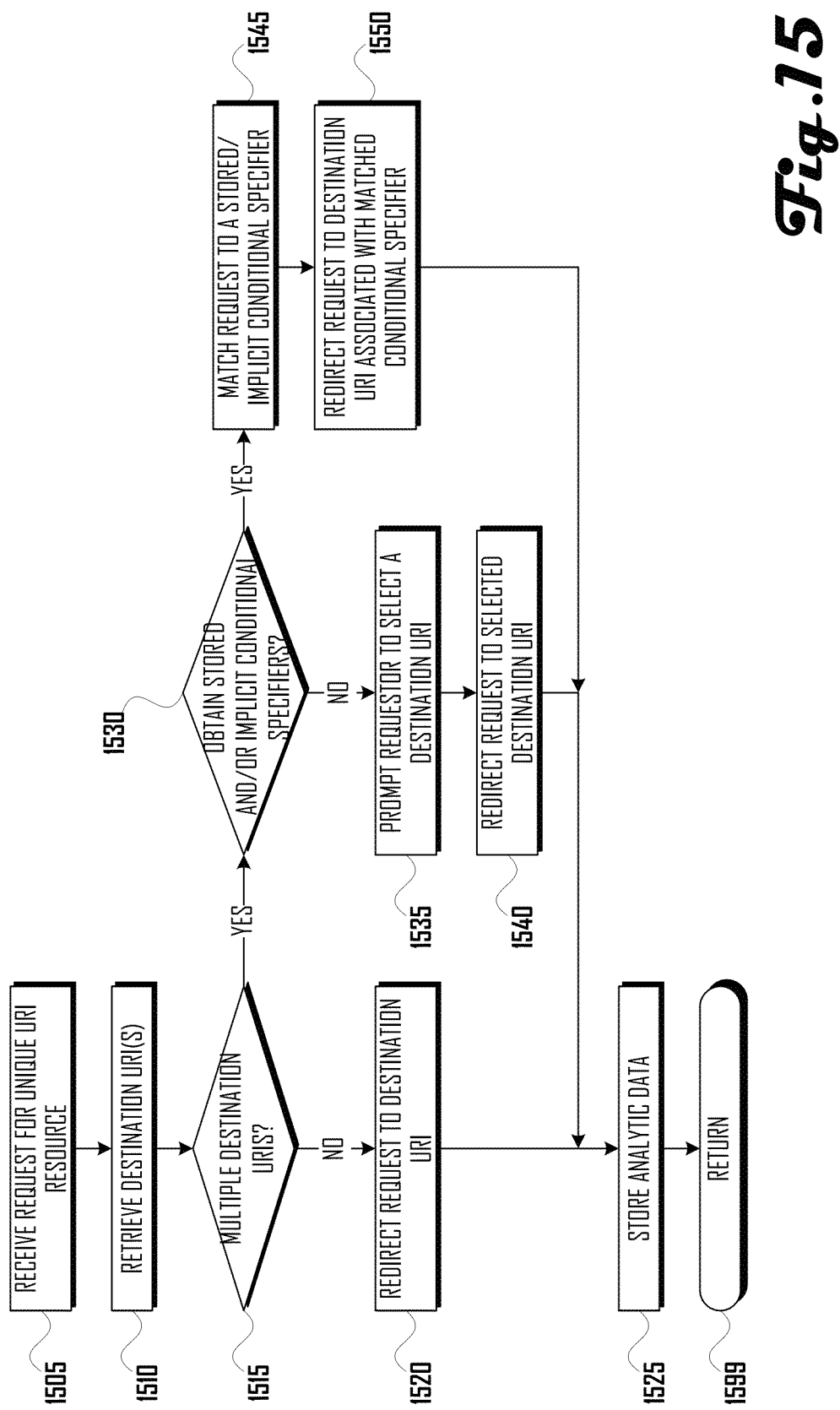
FIG. 15 illustrates a URI-redirection routine, such as may be performed by URI-service server in accordance with one embodiment.

FIG. 15 illustrates a URI-redirection routine 1500, such as may be performed by URI-service server 200 in accordance with one embodiment. In block 1505, routine 1500 receives a request for a resource identified by a previously generated unique URI. In some embodiments, the request may be received from a mobile device that obtained the unique URI by optically (or otherwise) scanning a machine-scannable-code generated according to FIG. 14, discussed above, and displayed on a rendering device.

In block 1510, routine 1500 retrieves the one or more destination URI(s) (e.g., from database 115) that are associated with the requested unique URI. In decision block 1515, routine 1500 determines whether more than one destination URI is associated with the requested unique URI. If only one destination URI is associated with the requested unique URI, then in block 1520, routine 1500 redirects the requestor to the destination URI. In various embodiments, the redirection mechanism may include a 3xx HTTP status code or other suitable redirection and/or forwarding scheme.

However, if more than one destination URI is associated with the requested unique URI, then in decision block 1530, routine 1500 determines whether it can obtain one or more stored and/or implicit conditional specifiers associated with the more than one destination URI. If routine 1500 cannot obtain one or more stored and/or implicit conditional specifiers, then in block 1535, routine 1500 may prompt the requestor to select one of the destination URI(s), such as by delivering a web page offering the requestor the various destination URI(s) as selectable options. In block 1540, routine 1500 redirects the requestor to the selected destination URI. In various embodiments, the redirection mechanism may include a 3xx HTTP status code or other suitable redirection and/or forwarding scheme.

On the other hand, if routine 1500 can obtain one or more stored and/or implicit conditional specifiers, then in block 1545, routine 1500 matches the request for the unique URI to one of the conditional specifiers. For example, in various embodiments, matching the request for the unique URI to one of the conditional specifiers may include determining metadata associated with the request, such as a requesting device type or software platform; a physical or logical location associated with the requesting device; a time of day, day of week, month, year or other time-related metadata; and the like. The determined metadata may then be compared against the two or more conditional specifiers to find a matching destination URI. In some embodiments, one of the destination URIs may be associated with a "default" or "fallback" conditional specifier, in the event that no other, more specific conditional specifier is found to match the request metadata. In block 1550, routine 1500 redirects the requestor to the matched destination URI.

In block 1525, routine 1500 stores one or more pieces of analytic metadata associated with the just-completed redirect. For example, in various embodiments, routine 1500 may determine and store metadata associated with the request, such as a requesting device type or software platform; a physical or logical location associated with the requesting device; a time of day, day of week, month, year or other time-related metadata; and the like. In some embodiments, routine 1500 may alternately or additionally classify analytic data according to a group identifier associated with the unique URI (if any).

Routine 1500 ends in block 1599. Subsequently, in some embodiments, routine 1500 may provide such analytic data in the form of a report to a URI-service client on whose behalf the unique URI redirection may have been provided.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A server-implemented method comprising:
   in response to receiving, by the server, a single request from a remote rendering device to get a machine-scannable-code image resource hosted by the server, said single request indicating a plurality of destination URIs, the server automatically:
   parsing said single request to identify said plurality of destination URIs;
   determining a plurality of conditional specifiers respectively associated with said plurality of destination URIs;
   obtaining a unique URI corresponding to said plurality of destination URIs;
   generating an image resource depicting at least in part a machine-scannable-code encoded with said unique URI;
   delivering to said remote rendering device said image resource depicting said machine-scannable-code encoded with said unique URI;
   subsequent to delivering said image resource, the server:
   receiving from a remote mobile device a second request for a resource identified by said unique URI, said remote mobile device having obtained said unique URI by scanning said delivered image resource rendered on a display associated with said remote rendering device;
   matching said second request to one of said plurality of conditional specifiers associated with said unique URI;
   selecting one of said plurality of destination URIs according to said matched one of said plurality of conditional specifiers; and
   redirecting said second request to said selected one of said plurality of destination URIs;
   wherein each of the plurality of conditional specifiers comprises one of a remote mobile device-type condition specifier, a location-based condition specifier, and a time-based condition specifier.

2. The method of claim 1, wherein obtaining a unique URI corresponding to said plurality of destination URIs comprises:
   generating a new unique URI corresponding to said plurality of destination URIs;
   respectively associating said plurality of destination URIs and said plurality of conditional specifiers in a database; and
   associating said unique URI with said plurality of destination URIs and said plurality of conditional specifiers in said database.

3. The method of claim 1, wherein determining said plurality of conditional specifiers respectively associated with said plurality of destination URIs comprises parsing said single request to identify said plurality of conditional specifiers.

4. The method of claim 1, wherein determining said plurality of conditional specifiers respectively associated with said plurality of destination URIs comprises determining a plurality of implicit conditional specifiers.

5. The method of claim 1, wherein matching said second request to one of said plurality of conditional specifiers associated with said unique URI comprises:
   determining a device type associated with said remote mobile device; and
   matching said determined device type to a device type specified by said one of said plurality of conditional specifiers.

6. The method of claim 1, further comprising,
   contemporaneous with redirecting said second request, the server storing analytic data associated with said selected one of said plurality of destination URIs and said matched one of said plurality of conditional specifiers.

7. The method of claim 6, wherein said analytic data comprises a determined device type associated with said remote mobile device.

8. The method of claim 1, wherein said machine-scannable code comprises a two-dimensional barcode.

9. The method of claim 1, wherein said single request comprises a single Hypertext Transfer Protocol "GET" request, said remote mobile device having obtained said destination URI from an attribute of an element from a markup language document hosted by a second, remote server.

10. A non-transitory computer-readable storage medium storing instructions that, when executed by a processor, configure the processor to perform the method of claim 1.

11. An apparatus comprising a processor and a storage medium storing instructions that, when executed by the processor, configure the apparatus to perform the method of claim 1.

* * * * *